Figure 1:
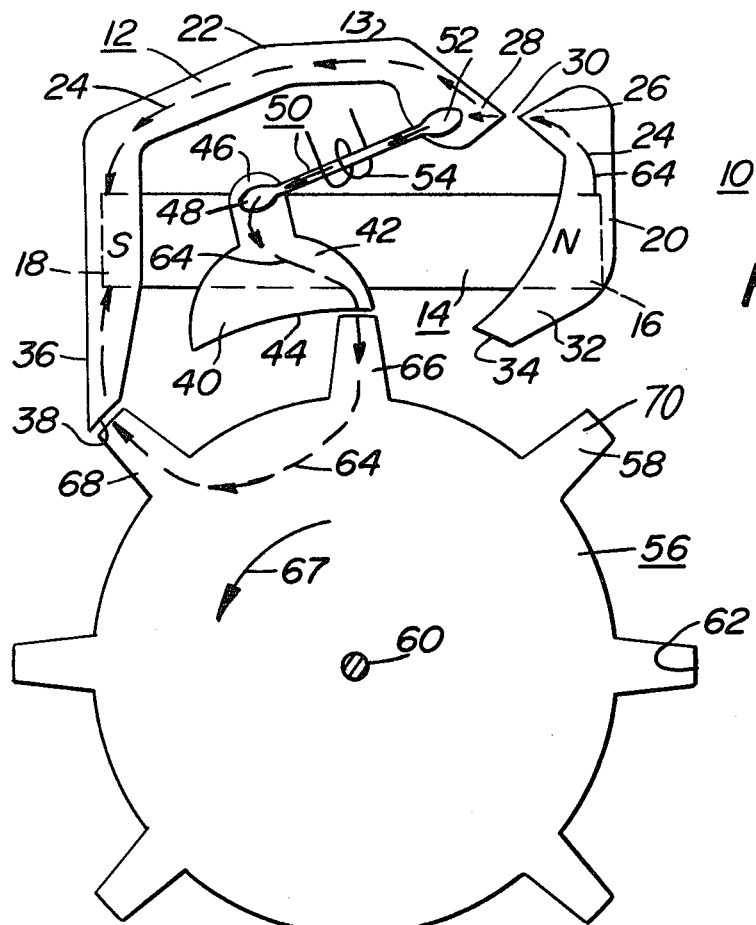

United States Patent [19]

Lathlaen

[11] 4,316,110
[45] Feb. 16, 1982

[54] SIGNAL GENERATING DEVICE

[75] Inventor: Richard A. Lathlaen, Hatfield, Pa.

[73] Assignee: TRW, Inc., Cleveland, Ohio

[21] Appl. No.: 972,865

[22] Filed: Dec. 26, 1978

[51] Int. Cl.$^2$ ............................................. H02K 21/38
[52] U.S. Cl. .................................... 310/155; 365/133; 310/168; 310/111; 123/146.5 A
[58] Field of Search ............... 310/152, 155, 168, 111, 310/156, 159; 365/133; 148/103, 108, 120, 31.57; 123/146.5 A, 148 E

[56] References Cited

U.S. PATENT DOCUMENTS

| | | | |
|---|---|---|---|
| 3,757,754 | 9/1973 | Wiegand | 123/146.5 A |
| 3,780,312 | 12/1973 | Wiegand | 310/168 X |
| 3,818,465 | 6/1974 | Wiegand | 365/133 |
| 3,820,090 | 6/1974 | Wiegand | 148/120 X |
| 3,866,193 | 2/1975 | Wiegand | 365/133 |
| 3,892,118 | 7/1975 | Wiegand | 365/133 |
| 4,150,314 | 4/1979 | Zabler et al. | 310/155 |
| 4,157,482 | 6/1979 | Kakinuma | 310/155 |

OTHER PUBLICATIONS

Philip E. Wigen, "Wiegand Wire: New Material For Magnetic-Based Devices", Electronics, Jul. 10, 1975, pp. 100-105.
"Wiegand Pulses Break Through Into New Applications", Canadian Controls and Instrumentaion, Dec. 1977, pp. 16-19.
"Wiegand Effect A New Pulse-Generating Option", Automotive Engineering, Feb. 1978, pp. 44-48.
Michael J. Sinko, "Applying the Wiegand Effect To Your Design", Digital Electronic Conference 1978.
David J. Marks and Michael J. Sinko, "The Wiegand Effect And Its Automotive Applications", Tech, Paper #780208, Congress and Expositions of Society of Automotive Engineers, Feb. 27/Mar. 3, 1978.
Earle Dilatush, "With No External Power Source, Clean Pulse-Generation Technique Creates Narrow, High-Level Outputs", EDN, Nov. 5, 1977, pp. 19-20.
"Electronic Ignition Systems for Motor Vehicles", Electronic Engineering, Dec. 1974, pp. 51-55.
"Wiegand Effect Simplifies Automotive Ignition Circuitry", Machine Design, Aug. 8, 1977, p. 8.

*Primary Examiner*—Donovan F. Duggan
*Attorney, Agent, or Firm*—Jacob Trachtman

[57] ABSTRACT

A signal generating device comprising a bistable magnetic device which alters its magnetic state when the density of magnetic flux to which it is subject passes through a predetermined value, and detecting means providing an output signal responsive to a change in magnetic state of said bistable device. A conducting means for magnetic flux comprises a first portion providing a first path of high permeability and a second portion, and has the bistable device connected between the first and second portions for conducting therebetween and being subjected to the conducted magnetic flux. The second portion provides second and third paths through the bistable device, each having a respectively alterable permeance for varying in an opposite relationship the respective reluctance of the second and third paths of the conducting means and the density and sense of magnetic flux to which the bistable device is subject. An energizing means provides magnetic flux of a given polarity to the conducting means for altering the state of the bistable device with the reluctance variations of said conducting means.

26 Claims, 7 Drawing Figures

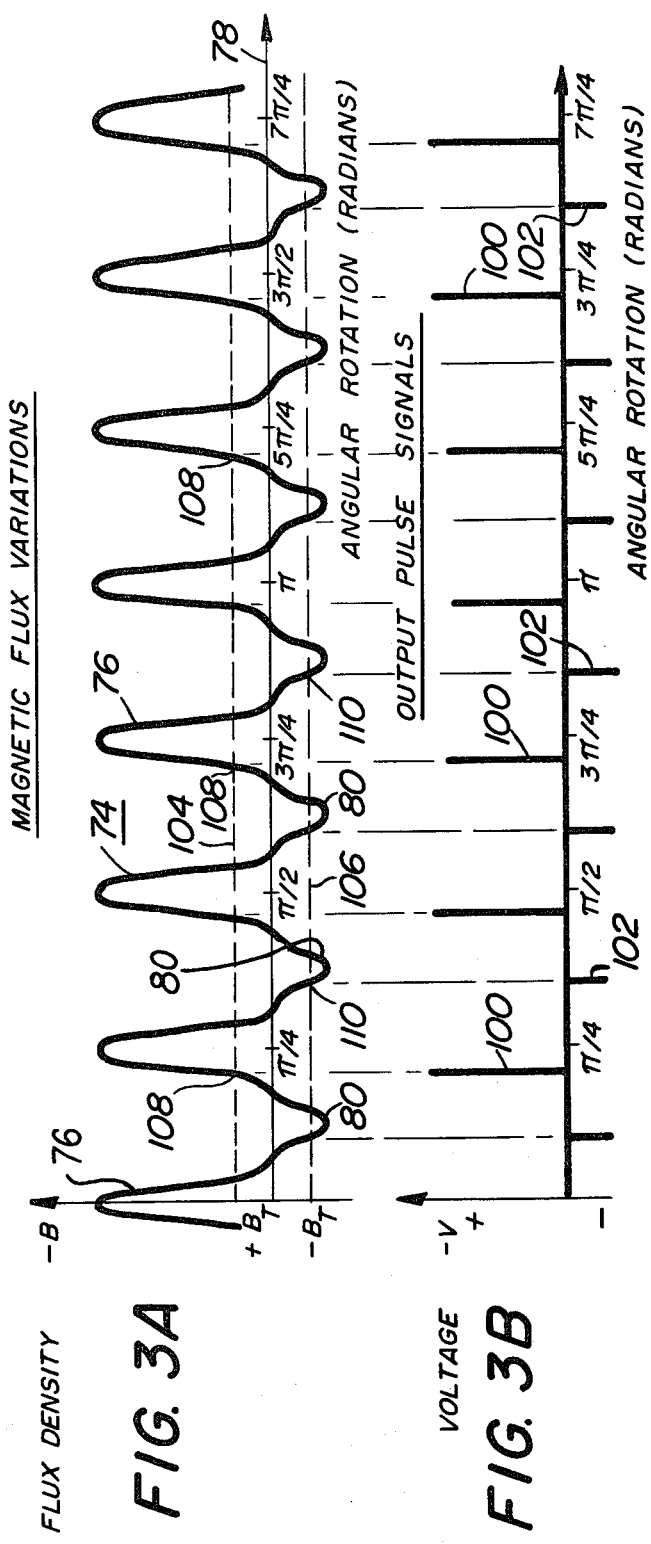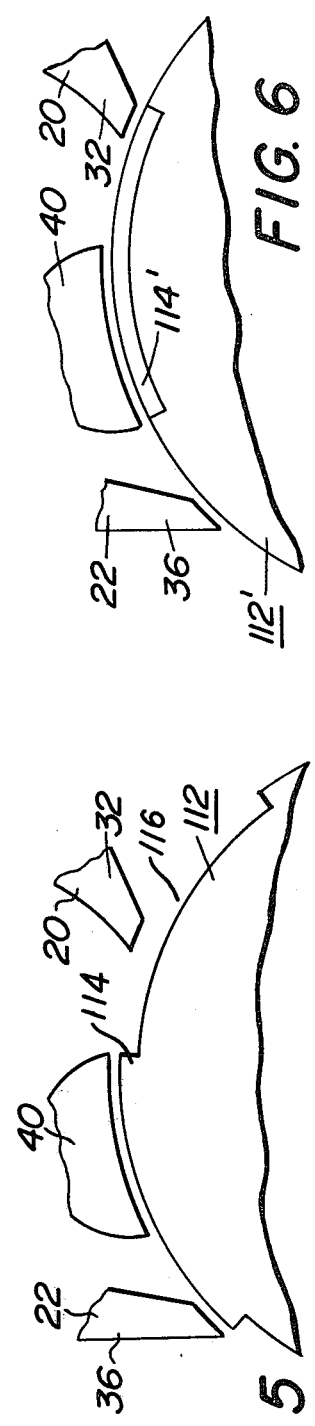

SIGNAL GENERATING DEVICE

The invention relates to a signal generating apparatus, and more particularly to an apparatus for detecting the position and sensing the frequency of rotation of a rotary body.

Heretofore, detecting devices have determined position and frequency by the sensing of radioactive emissions from a rotating shaft, detecting the magnetic field of a rotating magnet or electromagnet, and responding to hot and cold spots on a turning element by using a thermistor. In each such devices, the source of the emmination is fixed to the object whose motion is being detected. In another form proximity detectors which use magnets, light sources, and acoustic generators as part of a stationary assembly, react to nearby variations in a passive media which is to have its motion detected. In still another form, position and motion detectors are made to include a specialized form for the rotating element, to modify as a function of position the emmination from a stationary source.

The present invention relates to the latter type of a device in which a stationary bistable magnetic device senses the magnetic properties of a rotating member. The invention is this form provides many advantages including the ability to accurately detect the position of the rotating member and the frequency of its rotation. Highly accurate position detecting and frequency sensing are essential for various control functions.

Thus, the present invention, among its many applications, may be utilized for providing highly accurate timing signals for controlling the production of ignition signals, to the spark plugs of an internal combustion engine. The output signals are provided at required angular positions of a rotary member such as the engine crankshaft for timing and with a frequency corresponding to the rate of rotation of the crankshaft for other purposes. The output signals may also be advanced by an electrical control signal.

It is therefore an object of the present invention to provide a new and improved signal generating device for detecting the position and sensing the frequency of a rotary member.

Another object of the invention is to provide a new and improved signal generating device for providing output signals at selected angular positions of a rotary member and representing its position and the frequency of rotation.

Another object of the invention is to provide a new and improved signal generating device for providing timing signals which may be controlled and advanced by an electrical control signal.

Another object of the invention is to provide a new and improved signal generating device utilizing a stationary magnetic source and stationary magnetic flux detector for providing output signals indicating the position of a rotary member and its rotational frequency.

Another object of the invention is to provide a new and improved signal generating device for sensing the position and frequency of rotation of a body or shaft by requiring only minor modification of the rotating body or shaft.

Another object of the present invention is to provide a new and improved signal generating device which is highly efficient, reliable and durable.

The above objects and advantages, as well as many other advantages are achieved by providing a signal generating device comprising a bistable magnetic device which alters its magnetic state when the density of magnetic flux to which it is subject passes through a predetermined value. A detector winding positioned about the bistable device provides an output signal responsive to a change in magnetic state of the bistable device. A conducting means for magnetic flux subjects the bistable magnetic device to conducted magnetic flux with a density which passes through the predetermined value for altering the state of the bistable magnetic device. The conducting means comprises a first protion providing a first path of high permeability and a second portion. The bistable device is connected between the first and second portions of the conducting means for conducting magnetic flux therebetween, and being subjected to the conducted magnetic flux. The second portion provides second and third paths through the bistable device, each having a respectively alterable permeance for varying in an opposite relationship the respective reluctances of the second and third paths of the conducting means and the density and sense of magnetic flux to which the bistable device is subject. An energizing means provides magnetic flux of a given polarity to the conducting means for altering the state of the bistable device with the reluctance variations of the conducting means.

A rotatable member provides a maximum value of reluctance for the second path and a minimum value of reluctance for the third path when it is in one angular position. In another angular position, the rotatable member provides a minimum value of reluctance for the second path and the maximum value of reluctance for the third path. The rotation of the member between these positions provides respective reluctance values for the second and third paths which vary in an opposite relationship between respective minimum and maximum values as a function of the angular position of the member. The member may be rotationally driven in synchronism with an engine for providing output signals by the detecting means which are indicative of the angular position of the crank shaft and its frequency of rotation. The energizing means which is stationary may comprise a permanent magnet while the bistable device which is also stationary may be provided by a Wiegand wire which is subject to the varying magnetic flux densities, first in one sense and then in the other for producing the output signals by the detecting means.

Figure 4:
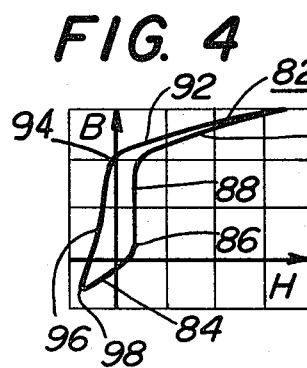
Figure 2:
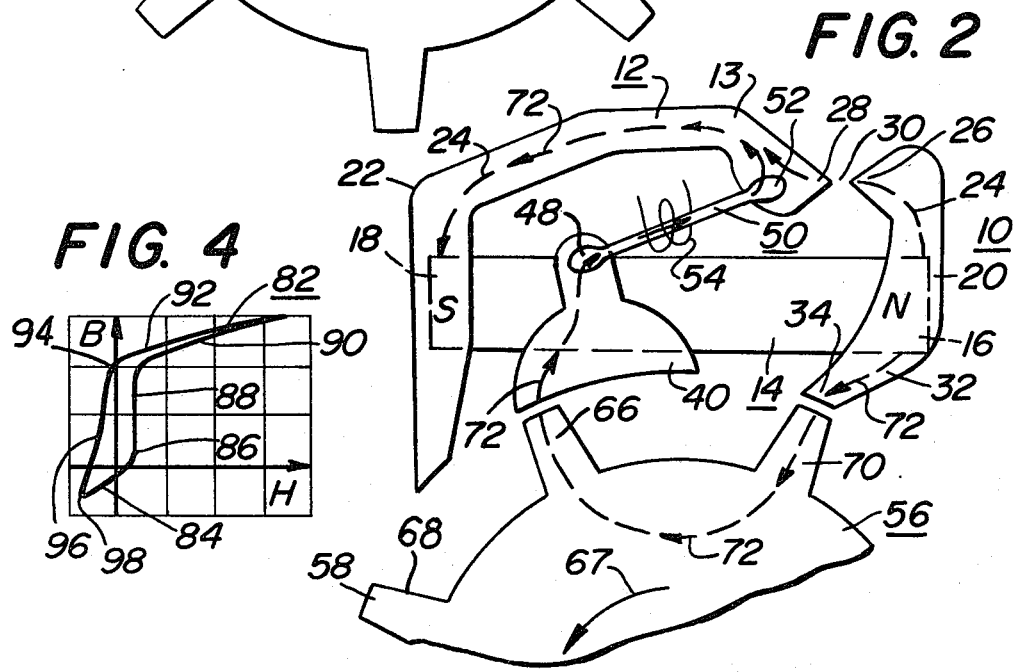

The foregoing and other objects of the invention will become more apparent as the following detailed description of the invention is read in conjunction with the drawing, in which:

FIG. 1 is a diagrammatic top plan view of a signal generating device embodying the invention, FIG. 2 is a view similar to that of FIG. 1 showing the rotary member displaced by 45°, and with portions of the rotary member broken away, FIG. 3A graphically illustrates the magnitude and sense of the flux variations to which the magnetic bistable device is subjected as a function of the angular position of the rotary member, FIG. 3B graphically illustrates the output signals provided by the signal detecting device as a function of the angular position of its rotary member, FIG. 4 is a graph illustrating the hysteresis characteriztic of a bistable magnetic device which is driven asymmetrically, FIG. 5 is a view similar to that of FIG. 1, with portions broken away, illustrating a variation in the form of the rotary member, and FIG. 6 is a view similar to that of FIG. 5 with portions broken away, illustrating another modified form of the rotary member.

Like reference numerals designate like parts throughout the several views.

FIGS. 1 and 2 illustrate a signal generating device 10 embodying the invention. The device 10 includes a conducting means 12 for magnetic flux and an energizing means 14. The energizing means 14 is a permanent magnet with north and south poles at its ends 16 and 18 as shown in FIG. 1. Alternatively, the means 14 may be an electromagnet having a coil energized by direct current with its amplitude being adjustable for controlling the phasing of output signals of the device 10.

The conducting means 12 includes a first portion 13 with an arcuate element 20 magnetically connected directly with the end 16 of the magnet 14, and a larger substantially "L" shaped element 22 which is magnetically connected directly with the south pole end 18. The elements 20 and 22 have high permeability, such as provided by known ferromagnetic materials. Magnetic flux from the north pole end 16 of the magnet 14 returns to its south pole end 18 by various means including a first path 24 which extends through the elements 20 and 22. The element 20 has a pointed end 26 spaced from a pointed end 28 of the element 22 to provide an air gap 30. The spacing of the gap 30 between the elements 20 and 22 is adjustable for controlling the reluctance of the path 24 and the flux which flows along it between the north and south pole ends 16 and 18 of the magnet 14. The other end 32 of the element 20 extends downwardly past the north pole end 16 to form a tapering pole piece with an arcuate end surface 34, while the other end 36 of the element 22 extends downwardly past the south pole end 18 of the magnet 14, to form another tapering pole piece with an arcuate end surface 38.

A second portion 40 of the conducting means 12 is positioned between and spaced from the pole piece ends 32 and 36 of the elements 20 and 22 of the first portion 13. The second portion 40 is supported above and out of magnetic contact with the magnet 14, as may be done by a spacing block of non magnetic material (not shown). The bottom end 42 of the portion 40 may be enlarged to provide a moon shaped configuration with a curved end 44 extending along an arc of a circle conforming with the surfaces 34 and 38 of the pole piece ends 32 and 36. Alternatively, the bottom end 42 may be forked to provide a pair of spaced pole pieces as will be evident from the operation of the device 10. The upper end 46 of the portion 40 is of reduced dimension with respect to the bottom portion 42.

A flattened end 48 of a bistable magnetic device 50 is connected, by welding or other suitable means with the upper end 46 of the portion 40 of the conducting means 12. The device 50 has its other flattened end 52 secured with the element 22 of the conducting means 12 near its pointed end 28. As illustrated in FIGS. 1 and 2, the device 50 is angularly positioned with respect to the extent of the magnet 14 and spaced from the conducting means 12 for achieving asymmetric operation, and can be positioned otherwise for this purpose or for obtaining symmetric operation as will be explained in connection with the operation of the device 10. The bistable magnetic device 50 has the form of an elongated wire and provides a magnetic path bridging the first and second portions 13 and 40 of the conducting means 12. The bistable magnetic device 50 is provided with winding 54 coiled between its ends 48 and 52 for detecting and providing output signals for the device 10.

A rotatable member 56 having a circular outer configuration with eight equally spaced radially extending teeth or cogs 58 is mounted for rotation, and can be rotated in either direction about a shaft 60. The shaft 60 may be joined with and driven by another apparatus or device which is to have its position detected or its rotational frequency sensed. The member 56, also may be an integral part of a device such as an engine crankshaft which is to have its position and frequency of rotation determined by the signal generating device 10. The cogs 58 and at least a portion of the member 56 between adjacent cogs 58 are made of magnetically soft material for providing low reluctance to magnetic flux. The end surface 62 of each of the cogs 58 lies on a circle which is concentric with the circle along which the end surfaces 34, 38 and 44 of the conducting means 12 are positioned. This arrangement provides a small air gap between the respective concentric end sufaces when they are positioned opposite to each other with the rotation of the member 56.

With the member 56 positioned as shown in FIG. 1, a second path 64 is provided by the conducting means 12 and member 56 between the north pole end 16 and the south pole end 18 of the magnet 14. The path 64 extends from the end 16 of the magnet 14 upwardly through the element 20 to its pointed end 26, through the air gap 30 to the pointed end 28 of the element 22, into the end 52 and through the bistable magnetic device 50 downwardly and to the left to its other end 48. From the end 48, the flux in path 64 enters the second portion 40 of the conducting means 12 and extends to the oppositely positioned cog 66 of the member 56 through the air gap therebetween. The flux path 64 leads into the adjacent cog 68 from where it enters the oppositely positioned pole piece end 36 through the air gap therebetween to return to the south pole end 18 of the magnet 14.

FIG. 2 shows the member 56 after it has been rotated in the counter clockwise direction (shown by the arrow 67) through an angle of 22.5°. This action moves the cog 66 to the left leaving it still opposite to the curved surface 44 of the second portion 40 of the conducting means 12. The result would be the same if the bottom 42 of portion 40 had a fork providing two spaced poles as previously described. The cog 68, however, has moved away from its position proximate to the pole piece end 36. The adjacent cog 70 to the right of cog 66, however, is now positioned opposite to the end surface 34 of the pole piece end 32. At this time, a third magnetic path 72 of low reluctance is provided between the north pole end 16 and south pole end 18 of the magnet 14 as follows. Flux passes downwardly from the magnet pole end 16 to the pole piece end 32 where it crosses the air gap formed with the cog 70 into the member 56. The path continues to the left through the member 56 and into the adjacent cog 66, where it extends through the air gap into the second portion 40 of the conductive means 12. The path now passes into the end 48 and to the right through the bistable magnetic device 50 in the upwardly direction towards its end 52. This direction is opposite to the downwardly passing direction of magnetic flux provided by the second path 64 through the bistable magnetic device 50. The magnetic path 72 is then received into the element 22 of the conducting means 12 to pass in the same direction to the left as the first path 24 to the south pole end 18 of the magnet 14.

The path 64 for magnetic flux illustrated in FIG. 1, has minimum reluctance when the member 56 is angularly positioned as shown, while its reluctance increases to its maximum value with the rotation through 22.5° of the member 56 to the position shown in FIG. 2. On the other hand, the third path 72 has minimum reluctance to magnetic flux when the member 56 is in the second position as illustrated in FIG. 2 which reluctance increases to its maximum value when the member 56 assumes its position shown in FIG. 1. Thus, the second path 64 has minimum reluctance value at the time when the third path 72 has maximum reluctance value, and alternately, the path 64 has maximum reluctance value when the paths 72 has minimum reluctance value. As the member 56 moves from one of its positions to the other, the respective reluctance values of the second and third paths 64 and 72 vary in an opposite relationship between respective minimum and maximum values as a function of the angular position of the member 56.

Since the flux through the second and third paths 64 and 72 pass in opposite directions or senses through the bistable magnetic device 50, the net resultant magnetic flux to which the bistable device 50 is subjected varies in a similar manner. Thus, when the reluctance of path 64 is minimum and the reluctance of path 72 is maximum, the net flux through the bistable device 50 will be in the downwardly left direction from the portion 13 to the portion 40 of the conducting means 12. Similarly, when the reluctance of path 64 is maximum and the reluctance of paths 72 is minimum, the net flux produced passes upwardly and to the right through the device 50 from the portion 40 to the portion 13 of the conducting means 12. With the respective out of phase variations of flux between the maximum and minimum values in opposite directions, the flux density through the bistable device 50 decreases from the maximum value in one direction or sense to zero value, and then increases in the other direction or sense to its maximum value. Such variations take place continuously with the rotation of the member 56. For the embodiment illustrated, the eight cogs 58 of the member 56 provide eight alterations of flux density through the device 50 with each rotation of the member 56, with one alternation for each 45° of angular displacement.

Under certain circumstances, it may be advantageous to obtain asymmetric operation of the bistable magnetic device 50. This may be accomplished by the arrangement of the components of the embodiment 10 illustrated in FIGS. 1 and 2. Such operation of the device 50 occurs when the device 50 is subjected to a maximum flux density in one direction or sense which is greater than the maximum flux density in the opposite sense. This is achieved in the disclosed embodiment by angularly positioning the device 50 with respect to the direction of extension of the magnet 14. This results in subjecting the device 50 in an unbalanced manner to the magnetic flux present in the air space surrounding the magnet 14. Thus, because of its orientation, the device 50 in addition to receiving magnetic flux conducted in the paths 64 and 72 of the conducting means 12, also receives flux through the air paths between the pole ends of the magnet. This flux is in that same direction through the device 50 as the flux in path 64 shown in FIG. 1. On the other hand, this magnetic flux is also in the direction opposite to the flux along the paths 72 through the device 50 as shown in FIG. 2. This results in an increased maximum flux value in the direction of path 64 and a reduced maximum flux value in the direction of path 72 through the device 50 as the member 56 rotates.

In addition to the effect on the bistable magnetic device 50 of the flux field around the magnet 14, the conducting means 12 is polarized by the flux which it conducts, and also produces a magnetic field in the air space about it. Thus, the effect of the flux along the paths 24 and 72 in the element 22 must also be considered, and the bistable magnetic device 50 positioned with respect thereto for obtaining the desired operation. The air gap 30 is adjustable for changing the reluctance in the first path 24 and the second path 64, thereby also controlling the effect of magnetic flux in these paths on the bistable magnetic device 50. Thus, by adjusting the position of the magnetic device 50, the relationship between the maximum values of the alternating flux to which it is subjected may be changed. In the case where the device 50 is to be symmetrically operated and subjected to maximum values of flux which are the same in either direction, the disposition of the device 50 may be altered by changing the configuration of the conducting means 12 and the angular position of the device 50 with respect to the magnet 14 to achieve the desired results. In this regard, it is noted that the device 50 will be least effected by magnetic flux in the air surrounding the magnet 14, when it is arranged intermediate to the pole ends 16 and 18 of magnet 14 and perpendicular to the direction of extension of the magnet 14.

The curve 74 in FIG. 3A represents the variation of total net magnetic flux through the bistable magnetic device 50 with angular rotation of the member 56. The portions 76 of the curve 74 above the horizontal axis 78, represent the magnetic flux density through the device 50 in the downwardly direction along the path 64 shown in FIG. 1. As the member 56 rotates, the flux reaches a maximum value after which it decreases to zero value and crosses the axis 78 in the downward direction. The portions of the curve 80 below the axis 78 represent the total net magnetic flux density in the opposite direction which passes upwardly through the bistable magnetic device 50 as illustrated in FIG. 2. The flux reaches a maximum value in this negative sense after which it returns to zero value and crosses the axis 78 in the upward direction. As seen in FIG. 3A, the curve 74 goes from a maximum value in the positive direction to a maximum value in the negative direction for each rotation of $\pi/8$ radians, and executes a full cycle in $\pi/4$ radians or 45°. The greater positive maximum amplitude of the portions 76 of the curve 74 with respect to the smaller maximum amplitude of the negative going portions 80 of the curve 74, illustrates the asymmetric condition to which the bistable magnetic device 50 is subject.

For a description of the asymmetric switching operation of a bistable magnetic device 50, reference is made to the hysteresis curve 82 of FIG. 4. The bistable magnetic device 50 may be of the type described in U.S. Pat. No. 3,820,090 issued June 25, 1974 entitled "Bistable Magnetic Devices." Such a bistable device 50 is also known as a Wiegand wire and comprises a wire of general uniform composition having a centrally relatively "soft" core portion and an outer relatively "hard" magnetized shell portion with relatively low and high coercivities, respectively. Such a Wiegand wire or device 50 may be made by properly work hardening a homogeneous magnetic alloy to provide the relatively "hard"

shell portion of high coercivity with respect to the central core. The device provides a high energy state when its flux extends externally, and a low energy state when its flux is substantially internal. In the low energy state, the flux in the shell captures and has a return path through the core of the device. Switching of the bistable magnetic device 50 occurs when the density of an applied external flux passes through a value which allows the applied flux to capture the core of the device from its shell. This results in a rapid increase in external flux density known as the "Wiegand Effect." This effect is detected as an output pulse signal by the detector winding 54. This phenomenon is also explained in detail in an article entitled "Wiegand Wire: New Material For Magnetic-Based Devices" by Philip E. Wignen in Electronics dated July 10, 1975, and in the article entitled "Wiegand Pulses Break Through Into New Applications" in Canadian Controls & Instrumentation dated December 1977. Although the hysteresis curve 82 of FIG. 4 illustrates a particular magnetic switching characteristic of the bistable magnetic device 50, devices with other characteristics or devices operated symmetrically may also be utilized as noted and illustrated in the article by Philip E. Wignen.

In considering the operation of the bistable magnetic device 50, the upwardly sloping portion 84 of FIG. 4 illustrate the change in magnetic density B of the bistable device 50 with an increase in the applied magnetic field intensity H. The magnetic field intensity H is related to the external magnetic flux density B to which the bistable magnetic device 50 is subjected. When the intensity H reaches the level 86 exceeding the zero value in a positive sense, a rapid change in flux density B of the device 50 occurs. This is indicated by the steep upward slope in the positive direction of the portion 88 of the curve providing the switching action of the bistable magnetic device 50. A further increase of the magnetic field intensity H in the positive direction, results in a smaller gradual increase in flux density B as illustrated by the reduced slope of the line 90. With the reduction and return of the magnetic field intensity H to zero value, and its increase in the negative direction, a gradual decrease in flux density B takes place as illustrated by the downward slope of the line 92. When the magnetic field intensity H reaches the value at point 94, a rapid change in the flux density B again occurs as illustrated by the downwardly curving line 96. This provides a second switching action of the device 50. At this time, the flux density B moves downwardly through zero value and increases in the opposite negative direction to the level illustrated at location 98. From the asymmetric nature of the curve 82, it is noted that the slope 96 is considerably less than the almost vertical slope 88 occurring during the other switching action. The limited energization of the device 50 by the magnetic field intensity H in the negative going direction because of the small negative-going portions 80 of the curve 74 in FIG. 3A, causes the curve 82 to reverse at location 98. This provides an asymmetrical configuration as the curve 82 slopes upwardly along the portion 84 to start a new cycle.

Subjecting the bistable magnetic device 50 to asymmetric operation results in the magnetication of its "hard" outer shell in only one direction, and the shell magnetism does not reverse as would occur during symmetrical operation. The core of the device 50, however, still switches from magnitization in one direction to the other to provide the two switching actions for each hysteresis cycle. The result is a slower switching slope 96 in the negative direction than that obtained by the slope 88 in the positive direction. Since the output voltage produced by the detector winding 54 about the bistable magnetic device 50 is a function of the rate of change of the magnetic flux density B during the switching operation, the larger signal results at the portion 88 of the hysteresis curve 82 than at portion 96. This results in an output signal by the detector winding 54 with correspondingly larger and smaller positive and negative portions 100 and 102, respectively.

The output signals produced are illustrated in FIG. 3B with the amplitude of the positive going pulses 100 being greater than the amplitude of the negative going pulses 102. The times of occurrence of the output pulses 100 and 102 are determined by the positive and negative flux density threshold values $B_T$ for switching of the device 50, which values are illustrated by the dashed lines 104 and 106, respectively of FIG. 3A. Each time the positive portion 76 of the curve 74 increases in the positive direction to reach the threshold value of flux density $B_T$, as at the points 108, the bistable magnetic device 50 switches state. Because of the very rapid change in its flux density, large amplitude pulses 100 are generated. These pulses 100 correspond to locations which are angularly displaced from each other by $\pi/4$ radians or 45°. Similarly, when the negative going portions 80 of the curve 76 increase in the negative direction to reach the negative threshold flux density $B_T$ represented by line 106, at the points 110, corresponding negative going pulses 102 are generated. However, the negative pulses 102 have a much smaller amplitude. These pulses are intermediate the pulses 100 and also displaced from each other by $\pi/4$ radians or 45°.

For some purposes it may be desirable to utilize only the pulses of one polarity while pulses of the opposite polarity are neglected. Under such circumstances, it may be desirable to enlarge the amplitude of the desired pulses at the expense of the undesired ones. This may be accomplished by driving the bistable magnetic device 50 asymmetrically, since as noted this increases the amplitude of the pulses which are to be used. In the case where both negative and positive pulses are to be utilized, the device 50 can be driven symmetrically to provide the desirable output signals.

Where it is desirable to control the magnetic intensity of the source, an electromagnet can be used, since the current of the electromagnet can be varied to adjust the maximum value of induced magnetic flux B. By such means, the value of maximum flux density to which the bistable magnetic device 50 is subject can be controlled. Since the threshold level of flux density $B_T$ remains unchanged, an increase or decrease in the flux density, as can be seen from FIG. 3A, will advance or retard the positions of the points 108 and 110 at which the curve 76 crosses the positive and negative threshold levels indicated by lines 104 and 106. This also advances or retards the delivery of the output pulse signals shown in FIG. 3B. Such control means for adjusting the occurrence of the output signals, is important particularly where such signals are used for timing purposes. For example, in connection with the ignition system of an internal combustion engine, the timing signals must be advanced and retarded depending upon the rate at which the crankshaft rotates. The detection of the crankshaft rotation rate, thus, may be used for controlling the advancement and retardation of the output signal for proper ignition timing.

The member 56 may also be provided in other forms as shown by the peripheral portion of a member 112 in FIG. 5. The rotary member 112 is a modified form of member 56 in which the outer periphery is provided with widened or elongated cogs 114 separated by intermediate depressed regions 116. This arrangement permits a cog 114 to extend between the second portion 40 and the pole piece end 36 of the element 22 to provide a magnetic path of low reluctance therebetween, while the pole piece end 32 of the element 20 is proximate to a depressed region 116 providing a high reluctance path to the portion 40. With the rotation of the member 112, a low reluctance conductive path is positioned between the pole piece end 32 and the second portion 40 to provide a low reluctance path, while the pole piece end 36 is over a depressed region 116 providing a high reluctance path to the portion 40. Thus, the member 112 operates in the same manner as the member 56 for producing the output signals by the signal generating device 10. Still another form of rotary member 112' is illustrated in FIG. 6. In this case, the rotary member 112' may be made of a non magnetic material and provided with inserts 114' of soft metallic material which operate in a same manner as the elongated teeth or cogs 114 of the device 112 in FIG. 5.

The relationship between the rotational positions of the member 56 and the output pulses 100, 102 of the detector winding 54, provides an accurate indication of the angular positions of the member 56. The frequency of rotation, is also provided by the frequency of the output pulse signals delivered by the winding 54. Thus, for the embodiment disclosed, one revolution of the member 56 is represented by the occurrence of 16 pulses of which eight are positive output pulses. Of course, it is understood that the member 56 may be modified to produce any number of output pulses for each revolution depending upon design requirements.

Although the invention has been described with respect to a particular embodiment, it will be obvious to those skilled in the art, that the invention disclosed may be modified to meet various design requirements without substantial departure from the essence of the invention.

What is claimed is:

1. A signal generating device comprising a bistable magnetic device which alters its magnetic state when the density of magnetic flux to which it is subject passes through a predetermined value, detecting means providing an output signal responsive to a change in magnetic state of said bistable device, conducting means for magnetic flux comprising a first portion providing a first path of high permeability and a second portion, said bistable device being connected between the first and second portions of said conducting means for conducting magnetic flux therebetween and being subjected to the conducted magnetic flux, the second portion providing second and third paths through said bistable device each having a respectively alterable permeance for varying in an opposite relationship the respective reluctance of the second and third paths of said conducting means and the density and sense of magnetic flux to which said bistable device is subject, and energizing means for providing magnetic flux of a given polarity to said conducting means for altering the state of said bistable device with the reluctance variations of said conducting means.

2. The device of claim 1 in which the first portion of said conducting means has first and second ends, and said energizing means has first and second ends respectively delivering and receiving flux from the first and second ends of the first portion of said conducting means.

3. The device of claim 2 in which said bistable device has a first end connected with the first portion of the conducting means at a location along its path intermediate its first and second ends, and a second end connected with the second portion of said conducting means for conducting flux therebetween.

4. The device of claim 3 in which the second portion of said conducting means has respective regions of high and variable permeability between the second end of said bistable device and the second end of said energizing means for providing the second path for conducting flux in one sense through said bistable device.

5. The device of claim 4 in which the second portion of said conducting means has respective regions of high and variable permeability between the second end of said bistable device and the first end of the energizing means for providing the third path for conducting flux in the other sense through said bistable device.

6. The device of claim 5 in which the regions of variable permeability of said second and third paths are provided by respective variable air gaps.

7. The device of claim 5 in which the regions of variable permeability of said second and third paths are respectively provided by fixed gaps of reduced permeability and a member providing paths of high permeability movable within the fixed gaps.

8. The device of claim 7 in which said member is rotatable for periodically varying in an opposite relationship the respective reluctances of the second and third paths of said conducting means.

9. The device of claim 8 in which said member provides a maximum value of reluctance for the second path and a minimum value of reluctance for the third path when it is in one angular position, and said member provides a minimum value of reluctance for the second path and a maximum value of reluctance for the third path when it is in another angular position, said member providing respective reluctance values for the second and third paths varying in an opposite relationship between said maximum and minimum values as a function of the angular position of said member.

10. The device of claim 9 in which the energizing means includes a permanent magnet with opposite magnetic poles at its ends.

11. The device of claim 9 in which the energizing means includes an electromagnet with opposite magnetic poles at its ends and an energizing coil, and an energizing source providing direct current to said coil, the value of direct current to said coil being adjustable for controlling the magnetic flux provided to said conducting means and the phasing of output signals by said detecting means.

12. The device of claim 8, 10 or 11 in which said rotatable member has a circular element with alternate consecutive peripheral first and second regions, the first regions being of ferromagnetic material providing high permeability and the second regions are of reduced permeability for respectively varying the reluctances of the second and third paths of said conducting means with the rotation of said member.

13. The device of claim 10 or 11 in which said member includes shaft means for being rotationally driven in synchronism with an engine for providing timed output signals by said detecting means.

14. The device of claim 3, 5, 8, 10 or 11 in which the first portion of said conducting means provides a region of adjustable permeance between one of its ends and the first end of said bistable device.

15. The device of claim 3, 5, 8, 10 or 11 in which said bistable device is positioned with respect to said energizing means and said conducting means for subjecting said bistable device to a maximum flux density in one sense which is greater than the maximum flux density in the other opposite sense for causing asymmetric operation of said bistable device.

16. The device of claim 3, 5, 8, 10 or 11 in which the first portion of said conducting means provides a region of adjustable permeance between one of its ends and the first end of said bistable device, and said bistable device is positioned with respect to said energizing means and said conducting means for subjecting said bistable device to a maximum flux density in one sense which is greater than the maximum flux density in the other opposite sense for causing asymmetric operation of said bistable device.

17. The device of claim 9 in which the first portion of said conducting means has an arcuate configuration with its first and second ends spaced from each other and respectively joined with the first and second ends of said energizing means, and includes first and second poles of high permeance which extend from the first and second ends of the first portion of said conducting means, the second portion of the conducting means is positioned within the ends of the first portion and extends to provide a third pole intermediate said first and second poles, the third pole is spaced from said first pole to provide the fixed gap of reduced permeability of the third path and is spaced from the second pole to provide the fixed gap of reduced permeability of the second path of said conducting means.

18. The device of claim 17 in which said member is rotatable proximate to said poles for periodically varying in an opposite relationship the respective reluctances of the second and third paths of said conducting means.

19. The device of claim 18 in which said member provides a maximum value of reluctance for the second path and a minimum value of reluctance for the third path when it is in one angular position, and said member provides a minimum value of reluctance for the second path and a maximum value of reluctance for the third path when it is in another angular position, said member providing respective reluctance values for the second and third paths varying in an opposite relationship between said maximum and minimum values as a function of the angular position of said member.

20. The device of claim 19 in which said rotatable member has a circular periphery with alternate first and second regions therealong, the first regions being of ferromagnetic material providing high permeability and the second regions are of reduced permeability, the regions being dimensioned and spaced so that when said member is in one angular position one of its first regions bridges the first and third poles to provide a minimum value of reluctance for the third path and a second region bridges the second and third poles to provide a maximum value of reluctance for the second path, and when said member is in another angular position one of the first regions bridges the second and third poles to provide a minimum value of reluctance for the second path and a second region bridges the first and third poles to provide a maximum value of reluctance for the third path, said member providing respective reluctance values for the second and third paths varying in an opposite relationship between said maximum and minimum values as a function of the angular position of said member.

21. The device of claim 20 in which said member includes shaft means for being rotationally driven in synchronism with an engine for providing timed output signals by said detecting means.

22. The device of claim 19 in which the energizing means includes a permanent bar magnet with opposite poles at its ends.

23. The device of claim 19 in which the energizing means includes an electromagnet with opposite magnetic poles at its ends and an energizing coil, and an energizing source providing direct current to said coil, the value of direct current to said coil being adjustable for controlling the magnetic flux provided to said conducting means and the phasing of output signals by said detecting means.

24. The device of claim 17, 22 or 23 in which the first portion of said conducting means has an adjustable air gap in the path between its first end and the first end of said bistable device.

25. The device of claim 17, 22 or 23 in which said bistable device is positioned with respect to said energizing means and said conducting means for subjecting said bistable device to a maximum flux density in one sense which is greater than the maximum flux density in the other opposite sense for causing asymmetric operation of said bistable device.

26. The device of claim 17, 20, 22 or 23 in which the first portion of said conducting means has a first substantially "L" shaped element magnetically connected directly with one end of said energizing means and extending arcuately along and with its other end spaced from the other end of said energizing means, and a second element magnetically connected directly with the other end of said energizing means and having an end spaced from the end of the first element to provide an adjustable air gap in the first and second paths, and said bistable device is positioned at an angle to said energizing means and with its first end connected with the end of the first element of the conducting means for subjecting said bistable device to a maximum flux density in one sense which is greater than the maximum flux density in the other opposite sense to cause asymmetric operation of said bistable device.

* * * * *